United States Patent
Hsieh et al.

[19]

[11] Patent Number: 5,995,150
[45] Date of Patent: Nov. 30, 1999

[54] DUAL COMPRESSED VIDEO BITSTREAM CAMERA FOR UNIVERSAL SERIAL BUS CONNECTION

[75] Inventors: Peter H. Hsieh, Sunnyvale; Hasan Gadjali, Freeport, both of Calif.

[73] Assignee: Winbond Electronics Corporation America, San Jose, Calif.

[21] Appl. No.: 09/026,865

[22] Filed: Feb. 20, 1998

[51] Int. Cl.$^6$ .................................................. H04N 7/24
[52] U.S. Cl. ......................................... 348/409; 348/845
[58] Field of Search ........................... 348/6, 8, 10, 384, 348/390, 400, 401, 402, 409, 415, 416, 423, 845, 845.3

[56] References Cited

U.S. PATENT DOCUMENTS

| | | | |
|---|---|---|---|
| 5,349,383 | 9/1994 | Parke | 348/401 |
| 5,742,343 | 4/1998 | Haskell | 348/415 |
| 5,818,531 | 10/1998 | Yamaguchi | 348/403 |

*Primary Examiner*—Bryan Tung
*Attorney, Agent, or Firm*—Proskauer Rose LLP

[57] ABSTRACT

A method for presenting video on a local monitor and a remote monitor includes encoding an original video signal to produce a first compressed video signal. Using the first compressed video signal, the video signal is also encoded to produce a second compressed video signal. Both the first and second compressed video signals are transmitted to a local terminal at which the first and second compressed video signals are decoded to produce first and second decoded video signals. A first decoded version of the video signal is produced from a combination of the first and second decoded video signals. Only the first compressed video signal is transmitted to a remote terminal at which a second decoded version of the video signal is recovered from only the first compressed video signal.

The first compressed video signal may be produced by motion compensation temporally encoding and spatially encoding the original video signal. The second compressed video signal may be produced by both spatially and motion compensation temporally decoding the first compressed video signal and subtracting each pixel of each picture thereof from a corresponding, spatially and temporally aligned pixel of a picture of the original video signal to form a difference video signal. The difference video signal is then only spatially encoded to produce the second compressed video signal.

To produce the first decoded version of the original video signal, the first compressed video signal may be both spatially and motion compensation temporally decoded and the second decoded video signal may be only spatially decoded. Each pixel of each picture of the second decoded video signal may be added to a corresponding temporally and spatially aligned picture pixel of the first decoded video signal.

18 Claims, 6 Drawing Sheets

DUAL COMPRESSED VIDEO BITSTREAM CAMERA FOR UNIVERSAL SERIAL BUS CONNECTION

RELATED APPLICATION

This application is related to the following patents and patent applications:

(1) U.S. patent application Ser. No. 08/708,388, entitled "Moving Picture Camera with Universal Serial Bus Interface," filed on Sep. 4, 1996, for Peter H. Hsieh and Shyh-Rong Wang, and (2) U.S. patent application Ser. No. 08/792,683, entitled "Digital Moving and Still Picture Camera Adaptor for Moving Picture Video Camera," filed Jan. 29, 1997 for Peter H. Hsieh and Hasan Gadjali.

The above-listed patent applications are assigned to the same assignee as this application and are incorporated herein by reference.

FIELD OF THE INVENTION

The present invention pertains to communicating compressed video signals, for example, for use in real time, interactive communications.

BACKGROUND OF THE INVENTION

Several techniques are known for encoding (i.e., compressing) video to produce a compressed video signal and for decoding such a compressed signal. See ISO/IEC IS 13818-1,2,3:Generic Coding of Moving Pictures and Associated Audio: Systems, Video and Audio ("MPEG-2"). FIG. 1 depicts an encoder 10 and decoder 12 according to an MPEG-1, or MPEG-2 main profile encoding and decoding standard. An original digital video signal V is inputted to the encoder 10. The video signal V is organized into macroblocks. Each macroblock includes a number of luminance blocks and a number of chrominance blocks. Each block is an 8×8 array of pixels.

Some macroblocks are only spatially encoded by spatial encoder 14 of the encoder 10. Other macroblocks are both spatially and temporally encoded using spatial encoder 14 and temporal encoder 16 of the encoder 10. Macroblocks that are only spatially encoded are outputted directly via output A to the spatial encoder 14. (Such output is shown as achieved by a switch 13 which may be implemented using software, control signals, etc.) Temporally encoded macroblocks are inputted to the subtractor 18 of the temporal encoder 16 to produce prediction error macroblocks. Prediction error macroblocks are outputted via output B to the spatial encoder 14. The spatial encoder 14 includes a discrete cosine transformer 20 which converts each block of each macroblock to spatial frequency coefficients. The spatial frequency coefficients are quantized by a quantizer 22 (and scanned according to some predetermined "zig-zag" or "alternate scan" ordering).

In temporally encoding a macroblock, a prediction macroblock is selected for each to-be-encoded macroblock, which prediction macroblock is subtracted from the to-be-encoded macroblock in the subtractor 18. The selection of a prediction macroblock may be made as follows. One or more pictures that precede and follow a to-be-encoded picture may be designated as reference pictures from which prediction macroblocks are selected. (Herein "picture" means field or frame as per MPEG-2 parlance.) Such reference pictures are encoded and decoded using the encoder 10 (and may themselves have been temporally encoded). A search is performed in each available reference picture to identify the macroblock therein that most closely matches the to-be-encoded macroblock of the to-be-encoded picture. This best matching macroblock is then selected as the prediction macroblock for the to-be-encoded macroblock. The prediction macroblock may be located in a reference picture that precedes the to-be-encoded picture, a reference picture that follows the to-be-encoded picture or may be an interpolation of multiple available candidate prediction macroblocks, each from a different reference picture. In some pictures, called P-pictures, the prediction macroblock candidates may only originate in one or more preceding pictures (or an interpolation thereof). In other pictures, called B-pictures, the prediction macroblock candidates may be selected from a preceding or following picture (or an interpolation thereof). In yet other pictures, called I-pictures, no prediction is formed. Rather, each macroblock is only spatially encoded. (Such spatially only encoded macroblocks are sometimes referred to as "intra macroblocks", whereas motion compensated temporally encoded macroblocks are sometimes referred to as "inter macroblocks"). In addition, if no adequate prediction macroblock candidate can be found for a macroblock in a P or B picture, the macroblock may be spatially only encoded.

The temporal encoder 16 includes a decoder 24. The decoder 24 includes a dequantizer 26 for dequantizing the coefficients output by the spatial encoder 14. The dequantized coefficients are inverse discrete cosine transformed by an inverse discrete cosine transformer 28 to produce pixel values. If the decoded macroblock was only spatially encoded, the decoded macroblock may be directly stored in a picture memory 30 via output C. If the decoded macroblock is a prediction error macroblock, the appropriate prediction macroblock is retrieved from the picture memory 30 (as described below) and added to the decoded prediction error macroblock in an adder 32. The macroblock of pixels thus formed is stored in the picture memory 30 via output D. Illustratively, only decoded macroblocks of reference pictures are stored in the picture memory 30.

The selection of the prediction macroblock is achieved as follows. The next to-be-encoded macroblock of the currently encoded picture is inputted to a motion compensator 34. The motion compensator 34 also receives from the picture memory 30 pixel data of reference pictures that may be used to predict the next to-be-encoded macroblock. Illustratively, the motion compensator 34 uses a block matching technique to identify the best matching macroblock (or interpolated mac roblock) from the reference picture (s). According to such a technique, multiple candidate prediction macroblocks are extracted from the available reference pictures and compared to the to-be-encoded macroblock. Each candidate prediction macroblock is shifted temporally with respect to the encoded macroblock (because the candidate prediction macroblocks originate from a different picture in time than the to-be-encoded block) and are spatially shifted relative to the to-be-encoded macroblock in increments as low as ½ pixels. The candidate prediction macroblock that best matches the to-be-encoded macroblock is selected as the prediction macroblock for temporally encoding the to-be-encoded macroblock. The prediction macroblock is identified by its temporal and spatial shift, referred to as a motion vector MV. The motion vector MV is outputted from the temporal encoder 16. In addition, such a motion vector MV may be saved (e.g., in picture memory 30) for later identification of the prediction macroblock when decoding the picture in decoder 24.

The spatially encoded macroblock and prediction error macroblock coefficient data and the motion vectors MV are furthermore entropy encoded by run-level, variable length encoder 36. The data may be stored in a buffer 37 that models the occupancy of a buffer of known size at the decoder. To ensure that the decoder's buffer does not overflow or underflow, the number of bits produced per encoded macroblock or prediction error macroblock may be adjusted using a quantizer adaptor 39. (In addition, pictures may be skipped and stuffing data may be appended before the beginning of selected encoded pictures.) The compressed video signal (bitstream) thus produced is outputted via a channel (which may be a transmission medium or a digital storage medium/record carrier, such as a magnetic disk, optical disc, memory, etc.) to the decoder 12. (For sake of brevity, the encoding of audio data, and the encapsulation of the compressed video and audio signals in a system layer stream, such as a transport stream or program stream, and a channel layer format, have been omitted in this discussion.)

The decoder 12 has a buffer 33 in which the received compressed video signal is temporarily stored. The bits of the compressed video signal are outputted to a variable length, run-level decoder 38 which performs the inverse operation as the variable length encoder 36 to recover the motion vectors MV and macroblock and prediction error macroblock coefficient data. The motion vectors MV and macroblock coefficient data are inputted to a decoder subcircuit 40 which is analogous to the decoder 24. The decoder subcircuit 40 decodes the video to produce decoded video DV for presentation.

MPEG-2 also provides scalability layers. See *B. HASKELL, A. PURI & A. NETRAVALI, DIGITAL VIDEO: AN INTRODUCTION TO MPEG-2*, ch. 9, p. 183–229 (1997). FIG. 2 shows a spatial scalability encoder 42 and decoders 44 and 46. The spatial scalability encoder 42 may be constructed simply as follows. A video signal is inputted to a spatial low pass filter or decimator 48 to produce a lower spatial resolution version of the video signal. A lower or base layer encoder 12 encodes the low resolution version of the video signal to produce a lower layer or base layer compressed video signal LLV. The base layer compressed video signal LLV is a fully and independently decodable and presentable video signal.

Next, an enhancement layer compressed video signal ELV is formed as follows. The full resolution version of the video signal V is predictively encoded in the spatial enhancement encoder 51. However, each temporal prediction macroblock produced by the motion compensator 34 of the spatial enhancement encoder 51 is inputted to a subtractor 52. The base layer compressed video signal LLV is decoded in a decoder 12 and interpolated in a spatial interpolator 50 to the full resolution of the original video signal V. This base layer decoded video signal, which is reconstructed from the base layer compressed video signal, contains reconstructed macroblocks which are used as spatial predictors. That is, the reconstructed macroblocks are fed to the subtractor 52 where they are subtracted from corresponding temporal prediction macroblocks produced by the motion compensator 34. (The spatial prediction macroblocks may be weighted by subtractor 52 before they are subtracted from the temporal prediction macroblocks). The prediction error macroblocks thus formed are then spatially encoded as described above to form an enhancement layer compressed video signal ELV.

Note that both the enhancement layer and base layer encoders 10 and 51 are similar to that described above and both form temporal predictions. This means that a spatial scalability encoder 10,51 must have two picture memories 30, 30' (i.e., capacity to store reference pictures for performing block matching at both the base layer and enhancement layer).

Two types of decoders are permissible for the spatial scalability profile encoded video signal. A first type of decoder 44 uses a decoder 12 of similar construction as shown in FIG. 1 to decode only the base layer compressed video signal LLV to produce a lower fidelity decoded base layer video signal DVL. A second type of decoder 46 decodes both the base layer compressed video signal LLV and the enhancement layer compressed video signal ELV. A base layer decoder 12 of the decoder 46 decodes the base layer compressed video signal LLV. A spatial interpolator 50 interpolates the base layer decoded video signal to the full resolution of the original video signal V. An enhancement layer decoder 53 decodes the enhancement layer compressed video signal. An adder 54 selectively adds (weighted) reconstructed macroblocks of the interpolated, decoded base layer video signal to prediction macroblocks reconstructed from the enhancement layer compressed video signal in order to reconstruct an enhanced fidelity enhancement layer video signal DVE.

FIG. 3 shows an SNR scalability encoder 56 and decoders 58 and 60. The encoder 56 is very similar as before with the following differences. As before, the spatial encoder has a quantizer 22 which outputs quantized coefficients to a run-level, variable length encoder 36. The quantized coefficient signal i.s dequantized by a dequantizer 26. The dequantized coefficient signal is subtracted from the original coefficient signal (outputted from the discrete cosine transformer 20) in a subtractor 64. The error signal thus produced is quantized in a second quantizer 22' to produce a quantizer error signal. The quantizer error signal is run-level and variable length encoded in a second run-level, variable length encoder 36'.

The decoder 66 of the temporal encoder 68 of the encoder 56 has a first dequantizer 26 which receives the quantized coefficients outputted form quantizer 22 and dequantizes them. The decoder 66 also has a second dequantizer 22' that receives the quantized error coefficients outputted from quantizer 22' and dequantizes them. These two dequantized coefficient signals are then added together in an adder 70. The rest of the encoder 56 is the same as in FIG. 1.

The encoded signal outputted from the run-level, variable length encoder 36 of encoder 56 is a fully independently decodable base layer compressed video signal LLV. Such a signal can be received at a base layer decoder 60 which has a similar structure as decoder 12.

The encoded signal outputted from the variable length encoder 36' of encoder 56 is an enhancement layer compressed video signal ELV which can only be decoded in conjunction with the base layer compressed video signal LLV. An enhancement layer decoder 58 has two run-level, variable length decoders 38, 38' for run-level and variable length decoding the base layer compressed video signal LLV and the enhancement layer compressed video signal ELV, respectively. These decoded video signals are then fed to dequantizers 26 and 26', respectively which dequantize these signals. Adder 70 then adds the two dequantized signals together prior to inverse discrete cosine transformation. The remainder of the decoding process is similar to before.

MPEG-2 also has a data partitioning profile and a temporal scalability profile. In the data partitioning profile, the bits of selected quantized coefficients are partitioned into a low precision portion and a precision extension portion. The precision extension portion, which serves solely to distinguish close quantization coefficient levels, is formed into an enhancement layer compressed video signal, whereas the remainder of the original encoded video signal forms a base layer compressed video signal. According to the temporal scalability profile, an original video signal is decimated in time to form a lower temporal resolution video signal. The lower temporal resolution video signal is encoded in a base layer encoder similar to encoder 12. The original temporal resolution video signal, and a low fidelity decoded base layer video signal are inputted to an enhancement layer encoder. The decoded reference pictures of the low fidelity decoded base layer video signal are used in addition to the decoded pictures of the enhancement layer compressed video signal for forming predictions.

Each of the scalability layers has been proposed for purposes of providing two levels of resolution or quality using the same bitstream. Base layer decoders can only decode the base layer compressed video signal to produce a lower fidelity decoded base layer video signal. Enhancement layer decoders can decode the base and enhanced layer compressed video signals to produce an enhanced fidelity decoded enhancement layer video signal. Nevertheless, both a base layer decoder and an enhancement layer decoder can decode the same bitstream.

It is desirable to use a computer as a video communication terminal. Low cost cameras are available which can produce high quality color and monochrome digital video. The problem is that the bit rate of such digital video signals far exceeds the maximum data input bit rate of any port on a common personal computer. Conventional solutions to this problem include using a camera with a proprietary interface and video capture card that is connected to the computer bus.

U.S. patent application Ser. Nos. 08/708,388 and 08/792,683 propose alternative solutions. These applications propose a camera with a built in encoder, or an encoder adaptor for a conventional video camera. The camera with encoder, or encoder adaptor have an interface that is compliant with the Universal Serial Bus (USB) standard. See Open HCI, Universal Serial Bus Specification v.1.0 Jan. 19, 1996. FIG. 4 shows a system 100 is shown with both types of camera attachment architectures. Illustratively, the system 100 can be used in a real-time, interactive moving picture communication application, a real-time non-interactive picture communication application, a still or moving picture capture application, etc. As shown, a camera 110 is connected to a computer system 120 externally to the housing 156 of the computer system 120. The computer system 120 illustratively includes a cpu bus 122, a system bus 124 (e.g., a PCI bus) and an I/O expansion bus 126 (e.g., as ISA bus). Connected to the cpu bus 122 is at least one processor 128 and a "north" bridge or memory controller 130. The north bridge 130 connects a cache 132 and a main memory 134 to the processors 128 on the cpu bus 122. The north bridge 130 also enables data transfers between devices on the system bus 124 and the memories 132 and 134 or the processors 128. Also connected to the system bus 124 is a graphics adapter 136. A display monitor 138 may be connected to the graphics adapter 136. As shown, an Ethernet adapter 160 may be connected to the system bus 124.

Connected to the I/O expansion bus 126 is a disk memory 140 and interface, such as an IDE interface, a modem 158, and input devices 142 such as keyboard 144 and mouse 146. (Alternatively, the keyboard 144 and mouse 146 may also be connected to the USB hub 150.) Also connected between the system bus 124 and the I/O expansion bus 126 is a south bridge 148 or I/O bridge. The south bridge 148 enables data transfers between devices on the I/O expansion bus 126, such as modem 158, and devices on the USB 200 or devices on the system bus 124. Illustratively, according to the invention, the south bridge 148 also includes a USB hub 150. The USB hub 150 has one or more serial ports 152 that are connected to standard USB compliant connectors 154 to which a connection may be made totally externally to the housing 156 of the computer system. Illustratively, the USB hubs 150, 117, 168, 190 and cables 119 form the USB bus 200.

The camera 110 is shown as including an imaging device 111, such as a tube, CMOS photo sensor or CCD, on which video images are incident. The imaging device 111 converts the image to a motion picture video signal representative thereof. The video signal is converted to digital form in ADC 113. The digital signal outputted from ADC 113 is received at a bit rate reduction circuit 115. The bit-rate reduction circuit 115 may be a programmable frame rate/resolution reduction circuit. Advantageously, however, the bit rate reduction circuit is a programmable video encoder. The bit rate reduced video signal is outputted to a USB hub circuit 117. The USB hub circuit 117 has a serial port 118 that can output the video signal as a serial bitstream via cable 119). The cable 119, which is plugged into the connector 154 (externally to the computer housing 156), delivers the video signal to the serial port 152 of the hub circuit 150 in the south bridge 148.

The reduction of the bit rate by the video encoder 115 ensures that the video signal has a sufficiently low enough bandwidth to be received by the USB serial port 152. Various compression standards such as MPEG-1, MPEG-2, H.263, etc. may be used by the bit rate reduction circuit 115 to encode the video signal.

Note that the USB 200, in particular, the serial ports 118 and 154 of the hubs 150, 117, 168 support bidirectional transfer of signals. In addition to transferring video signals from the hub 117 to the hub 150, data may be transferred from the hub 150 to the hub 117 by interspersing the video signal and the data transfer signal. Such data transfers can be used to program/adjust the video encoder 115. For example, the video encoder 115 can be programmed to encode the video in compliance with a number of compression standards such as, H.263, MPEG-1, MPEG-2, JPEG, motion JPEG, etc. Furthermore, within any given standard, different parameters may be adjusted such as quantization step sizes, inter/intra decision thresholds, group of picture formats, bit rate, etc and different encoding options, such as arithmetic coding, may be selected.

Advantageously, a microphone 162 receives an audible sound and converts it to an audio signal in real time as the camera 110 receives an image. An ADC 164 digitizes the audio signal and an audio encoder 166 encodes the audio signal. Illustratively, a USB hub circuit 168 receives the compressed audio signal and transmits it in bit serial form from serial port 170 to the hub 117, interspersed with the video signal outputted from the camera 110 and any other data signal transmitted on the USB 200.

The hub 150 receives the bit rate reduced video (and illustratively the compressed audio signal). The received signals may be transferred via south bridge 148, system bus 124, and north bridge 130 into one of the memories 132 or 134. From there, the video and/or audio signal may be processed by the processor 128, e.g., error protected using an error protection code, encoded, if necessary, etc. The video and/or audio signal may then be outputted (in multiplexed form) via north bridge 130, system bus 124, Ethernet adapter 160 and an ethernet network to a far end, remote video conferencing system 100' of similar architecture as the video conferencing system 100 (i.e., having a computer system 120' and camera 110'). Alternatively, or in addition, the compressed video and/or compressed audio signals can be outputted via north bridge 130, system bus 124, south bridge 148, I/O expansion bus 126, modem 158 and a public telephone network to the far end, remote video conferencing system 100'. In another embodiment, the compressed video and/or compressed audio signals received at the hub 150 are outputted directly to the Ethernet adapter 160 or modem 158, both of which can be connected to the USB 200.

A compressed video and/or compressed audio signal may be received from the far end, remote video conferencing system 100' at the near end, local video conferencing system 100 shown in FIG. 4. The compressed video and/or compressed audio signals may be received at the Ethernet adapter 160 or at the modem 158. A compressed video and/or compressed audio signal received at the Ethernet adapter 160 may be transferred via system bus 124 and north bridge 130 to main memory 132 or cache memory 134. Alternatively, if the compressed video and compressed audio signals are received at the modem 158, the compressed video and compressed audio signals are transferred via the I/O expansion bus 126, south bridge 148, system bus 124 and north bridge 130 to the memory 132 or 134. From there, the processor 128 may separate the compressed video and compressed audio signals for further processing such as error correction, decryption, and decoding. Alternatively, a special purpose processor (not shown) may be connected to the system bus 124 for performing at least the video signal decoding. In yet another embodiment, a special processor for performing video decoding may be included with the graphics adapter 136 to which the compressed video signal is directly transferred (i.e., from the modem 158 or Ethernet adapter 160). The decoded video signal is transferred to the graphics adapter 136 (or is present thereat). The graphics adapter 136 outputs the decoded video signal on the display monitor 138. In addition, the decoded audio signal is also received via the graphics adapter 136 and outputted to a loudspeaker contained in the display monitor 138.

In the alternative digital video capture embodiment, a digital or analog video signal produced by a camera 110" is outputted to an adaptor 180. The adaptor 180 has a video encoder 195 with a built in USB hub 190. The USB hub 190 is part of the USB 200. The video encoder 195 encodes a digital version of the received video signal in an analogous fashion as above, and transfers the compressed video signal via the (USB hub 190) and USB 200 to the computer system 200.

The system 100 therefore provides an economical and useful manner for providing video communications on a personal computer system 120. In a typical home or business, the communicating systems 100 and 100' typically use modems and the telephone network to communicate. Recent advances enable duplex communication of up to 33.6 Kbits/sec using an ordinary voice connection, assuming that a "clean" (i.e., low noise) circuit is established between the systems 100 and 100' and both systems 100 and 100' have compliant modems with such capability. Sometimes, a single ISDN connection is used to carry the video conference, thereby affording up to 128 Kbits/sec for each communication.

At such low bit rates, a high level of compression is needed to produce a real-time, low latency compressed moving picture video signal. Moving pictures decoded from such compressed video signals have a. large amount of humanly perceptible compression artifacts. Such artifacts degrade the video signal and lower its quality.

In addition to presenting (displaying) at the local system 100 decoded pictures of the remotely originating compressed video signal, it is also desirable to present decoded pictures of the locally originating video signal. For example, the display screen of the display monitor 138 may be divided into two areas or may display two windows. The first window or area displays pictures decoded from the remotely originating compressed video signal. The second window or area displays pictures decoded from the locally originating compressed video signal (which locally originating compressed video signal is also transmitted to the remote system 100'). The problem is that the displayed pictures of the locally originating compressed video signal are reconstructed from the very same locally compressed video signal that is transmitted to the remote system 100'. As noted above, the communication channel over which the locally originating compressed video signal is transmitted has a limited bandwidth. As a result, the locally originating compressed video signal must be highly compressed so that fidelity degrading compression artifacts are introduced into the reconstructed pictures. While such compression artifacts (in the pictures reconstructed from the locally originating compressed video signal) must be tolerated at the remote system 100' considering the bandwidth limitations of the communication channel from which the locally originating compressed video signal is received, such channel bandwidth constraints do not exist at the local system 100 vis-a-vis the locally originating compressed video signal. Thus, such degradations in fidelity of locally displayed pictures reconstructed from locally originating compressed video at the local system 100 are disadvantageous and unnecessary.

It is an object of the present invention to overcome the disadvantages of the prior art.

SUMMARY OF THE INVENTION

This and other objects are achieved by the present invention. According to one embodiment, a method is provided for presenting, i.e., displaying video on a local monitor and a remote monitor. A video signal is produced, e.g., by a video signal source. The video signal is encoded by a video encoder to produce a first compressed video signal. Using the first compressed video signal, the video signal produced by the video signal source is also encoded to produce a second compressed video signal. Both the first and second compressed video signals are transmitted to a local terminal. At the local terminal, the first and second compressed video signals are decoded, e.g., using a decoder, to produce first and second decoded video signals. A first decoded version of the video signal is produced from a combination of the decoded first and second video signals. Only the first compressed video signal is transmitted to a remote terminal via a communication channel, whereby the remote terminal can recover a second decoded version of the video signal from only the first compressed video signal.

As may be appreciated, the communication channel between the local and remote terminals may have sufficient bandwidth to carry the first compressed video signal, but not the second compressed video signal as well. Nevertheless, the communication channel between the encoder and local terminal does have sufficient bandwidth to carry both the first and second compressed video signals. As such, the local terminal can decode and reconstruct higher quality versions of the locally originating pictures using both the first and second compressed video signals. On the other hand, the already encoded first compressed video signal is available for simple transmission to the remote terminal.

According to another embodiment, a method is provided for encoding a video signal including producing a video signal containing a sequence of original pictures, e.g., using a video signal source. The video signal is encoded, e.g., using an encoder, to produce a first compressed video signal. In encoding the original video signal to produce the first compressed video signal, motion compensation temporal encoding is used for at least a part of the original video signal. Spatial encoding is also used to encode the original video signal to produce the first compressed video signal. The first compressed video signal is then both spatially and motion compensation temporally decoded, e.g., using a decoder, to produce a decoded video signal. Each pixel of each picture of the decoded video signal is then subtracted from a corresponding, spatially and temporally aligned pixel of a picture of the original video signal to form a difference video signal. The difference video signal is then encoded using only spatial encoding on each picture of the difference video signal.

As may be appreciated, this technique may be used to produce the first and second compressed video signals, wherein the compressed difference video signal is the second video signal not transmitted to the remote terminal. According to yet another embodiment, a method for presenting a decoded video signal is provided. First and second compressed video signals are received at a decoder. The decoder spatially and motion compensation temporally decodes the first compressed video signal to produce a first decoded video signal. The second compressed video signal is spatially decoded to produce a second spatially only decoded video signal. An adder adds each pixel of each picture of the second spatially only decoded video signal to a corresponding temporally and spatially aligned picture pixel of the first decoded video signal to reconstruct a reconstructed video signal. The reconstructed video signal is then presented (i.e., displayed).

DETAILED DESCRIPTION OF THE INVENTION

In this illustration of the invention, the video signals are presumed to be progressively scanned or deinterlaced. Thus, each picture of the video signal is a frame. However, the invention is equally applicable to interlaced video signals having field pictures. In addition, the MPEG-1, MPEG-2, or H.263 spatial and motion compensated temporal encoding model are used in the illustration. In these models, spatial encoding includes a discrete cosine transform as an orthogonal transform, a quantizer and entropy encoding. Motion compensated temporal encoding is performed on a macroblock or sub-picture basis, wherein the prediction macroblock is both temporally and spatially offset according to a motion vector. The prediction macroblock is therefore not temporally aligned with the to-be-encoded macroblock that it predicts because the prediction macroblock originates from a different picture than (i.e., precedent or subsequent to) the picture containing the to-be-encoded macroblock. Furthermore, at least one prediction macroblock is also not spatially aligned with the to-be-encoded macroblock it predicts. This means that the prediction macroblock does not begin and end on the same rows and/or columns of pixels within the reference picture as the beginning and ending rows and/or columns within the to-be-encoded picture of the to-be-encoded macroblock.

Figure 5:
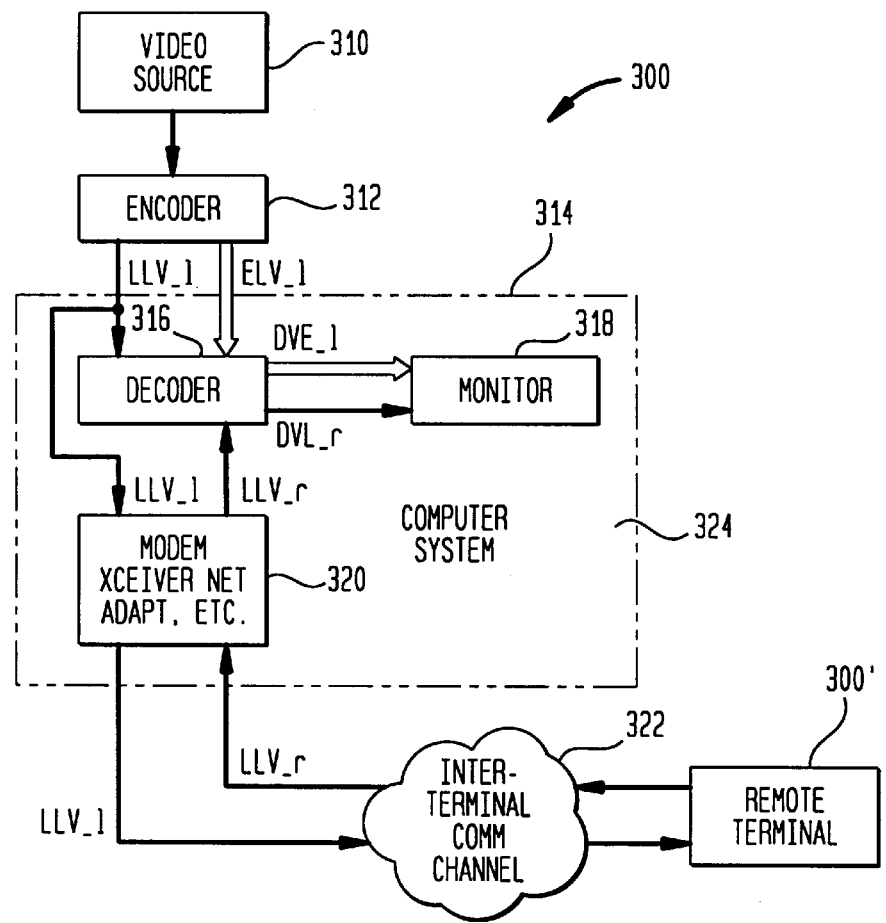
FIG. 5 shows a video communications terminal according to an embodiment of the invention.

FIG. 5 shows a video communication terminal 300 according to the invention. The terminal 300 is a local terminal. The local terminal 300 is connected via an interterminal communication channel 322 to a like remote terminal 300'. The communication channel 322 may be implemented in a network, local area network, telephone network, terrestrial network or satellite broadcast network (the air or space), etc.

The local terminal 300 includes a video signal source 310, such as an imaging device (CCD, CMOS photo sensor, tube, etc.), digital storage medium, etc. The video signal source 310 outputs a locally originating video signal to an encoder 312. The video signal illustratively is continuous and real-time captured and encoded but may also be preliminarily or "off-line" encoded in non-real time, stored in a digital storage medium and then played back. The video signal is digitized and formatted into blocks and macroblocks. The encoder 312 encodes the video signal to produce a base layer compressed video signal LLV_l and an enhancement layer compressed video signal ELV_l. The base layer compressed video signal LLV_l and the enhancement layer compressed video signal ELV_l, though shown as separated, are advantageously multiplexed together into a single stream or signal.

These signals LLV_l and ELV_l are transmitted through a housing 314 of a computer system 324. Illustratively, the combined bit rate of the LLV_l and ELV_l signals is sufficiently low to be time division multiplexed and serially transmitted via a USB type of connection. The signals LLV_l and ELV_l are received at a decoder 316. The decoder 316 spatially and motion compensation temporally decodes the signal LLV_l to produce the decoded base layer video signal DLV_l. The decoder 316 also spatially only decodes the signal ELV_l. The decoder 316 adds each pixel of each picture of the decoded ELV_l signal to a corresponding spatially and temporally aligned pixel of a picture of the decoded DLV_l signal, i.e., in the same row and same column of the same sequential picture. This produces the decoded enhancement layer video signal DVE_l.

Meanwhile, the base layer compressed video signal LLV_l is also (demultiplexed and) transferred to a transceiver 320 which can be an RF broadcast transmitter, a modem, a network adaptor, etc. The transceiver 320 transmits the base layer compressed video signal LLV_l to the remote terminal 300' via the communication channel 322. The transceiver 320 also receives a base layer compressed video signal LLV_r from the remote terminal 300' via the communication channel 322. The base layer compressed video signal LLV_r originates from the remote terminal 300' and advantageously depicts (when decoded and presented) real-time captured and decoded moving picture video of an image or scene at the remote terminal 300'.

The decoder 316 receives the base layer video compressed signal LLV_r from the transceiver 320. The decoder 316 decodes the base layer compressed video signal LLV_r to produce the (low fidelity) decoded base layer video signal DVL_r. The two locally decoded video signals, namely, DVE_l and DVL_r are then presented, i.e., displayed, on the display monitor 318. The decoded video signals DVE_l and DVL_r may be displayed in different halves of the display screen of the display monitor 318. Alternatively, the decoded video signals DVE_l and DVL_r are displayed in different (dynamically moveable and adjustable) windows on the display screen of the display monitor 318.

Figure 4:
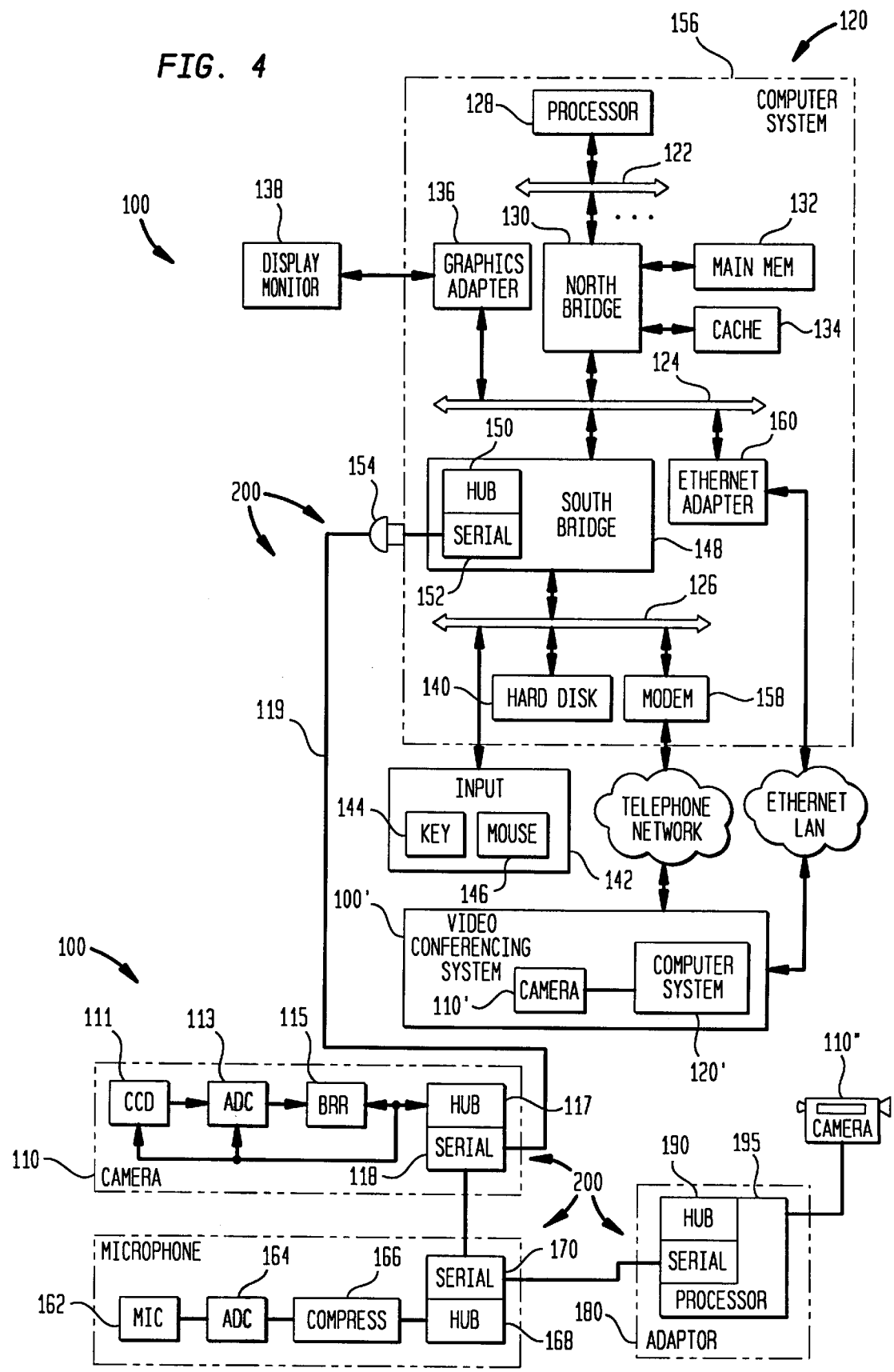
FIG. 4 shows a video communication system employing cameras and PC's as local and remote terminals.

The local terminal 300 may be physically implemented in hardware using the camera 110 or 110" and personal computer system 120 of FIG. 4. In such a case, the video signal source 310 may be implemented using the imaging device 111, or camera 110", hard disk 140, etc., the encoder 312 may be implemented using the bit rate reducer 115 or processor 195, the housing 314 corresponds to the housing 156, the transceiver 320 may be implemented using the modem 158 or Ethernet adaptor 160 and the display monitor 318 corresponds to the display monitor 138. The decoder 316 can be implemented in the processor 128 and memory 132, 134, the graphics adaptor 136 or another suitable decoding circuit connected to one of the busses 126, 124 or 122. The locally originating compressed video signals LLV_l and ELV_l may be inputted to the decoder 316 via the USB 200.

Not shown in FIG. 5 is hardware for detecting, encoding, transmitting, receiving, decoding and presenting audio. However, suitable circuitry, such as microphone 162, compressor 166, USB 200, external loudspeakers or loudspeakers of display monitor 138, etc. of FIG. 4 may be used as described above.

As noted above, the USB can support a data rate of up to 12 Mbits/sec. On the other hand, the communication channel 322 may have a duplex transmission bit rate that is no higher than 33.6 Kbits/sec. At least part of the bandwidth must be allocated to audio. Thus, each signal LLV_l and LLV_r might be allocated much less than 5% of the maximum bandwidth of the USB. Thus, a substantially higher bandwidth can be supported for the connection between the encoder 312 and the decoder 316. A large amount of excess bandwidth may be allocated to the locally originating enhancement layer compressed video signal ELV_l. As such, the decoded enhanced video signal DVE_l reproduced from the locally originating enhancement layer compressed video signal ELV_l and the locally originating base layer compressed video signal LLV_l can have a very high fidelity (depending on how much of the excess USB bandwidth not used for LLV_l is allocated for ELV_l) in comparison to the decoded base layer video signal DVL_r reproduced from the remotely originating base layer compressed video signal LLV_r (or the locally originating base layer compressed video signal LLV_l alone).

Note that the decoder 316 must simultaneously decode three signals, namely, LLV_l, ELV_l and LLV_r. It is therefore desirable to simplify the decoding of these signals as much as possible to reduce the processing requirements of the decoder 316. According to another embodiment of the invention, this is achieved by simplifying the encoding and decoding of the signal ELV_l. While a more complicated encoding technique or architecture might conserve bandwidth in producing an enhancement layer compressed video signal ELV_l that can be decoded to reconstruct a particular fidelity decoded enhanced video signal DVE_l, the USB has a vast excess capacity which may be allocated to ELV_l. Thus, a simple encoding technique or architecture that is amenable to a simple decoding technique or architecture justifies this sacrifice of USB bandwidth in favor of conserving encoding and decoding resources and simplifying the encoder and decoder architectures. The invention also conserves memory space.

Figure 6:
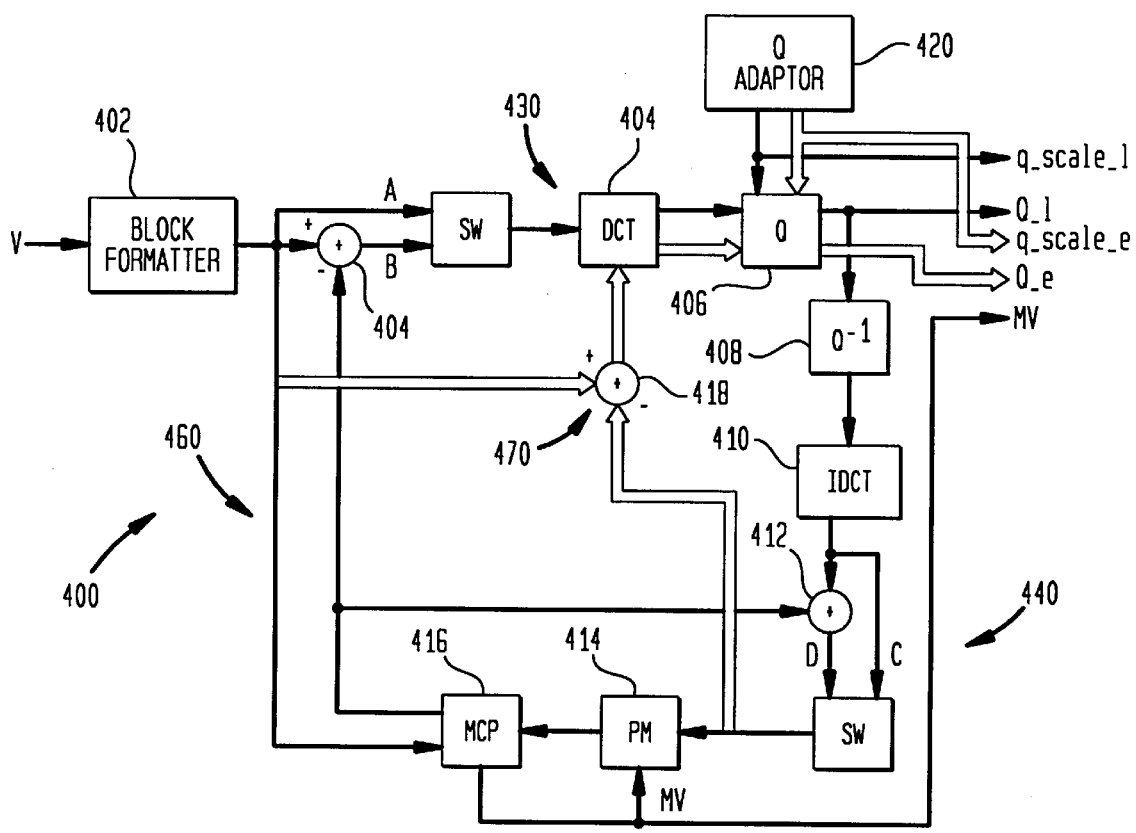
FIG. 6 shows a video encoder according to an embodiment of the invention.

FIG. 6 shows an encoder 400 according to an embodiment of the present invention. The encoder 400 includes a base layer spatial encoder 430, a base layer temporal encoder 460 and an enhancement layer encoder 470. The spatial encoder 430 includes a discrete cosine transformer 404, a quantizer 406, a quantizer adaptor 420 a run-level, variable length encoder (NOT SHOWN) and a rate buffer (NOT SHOWN). The temporal encoder 460 includes a spatial decoder 440, a motion compensator 416 and a subtractor 404. The spatial decoder 440 includes a dequantizer 408, an inverse discrete cosine transformer 410, an adder 412 and a picture memory 414. The enhancement layer encoder 470 includes the dequantizer 408, inverse discrete cosine transformer 410, the adder 412, a subtractor 418, the discrete cosine transformer 404, the quantizer 406, the quantizer adaptor 420 a run-level, variable length encoder (NOT SHOWN) and a rate buffer (NOT SHOWN). A block formatter 402 is also provided but may be omitted if the video signal is already formatted into blocks and macroblocks.

Figure 1:
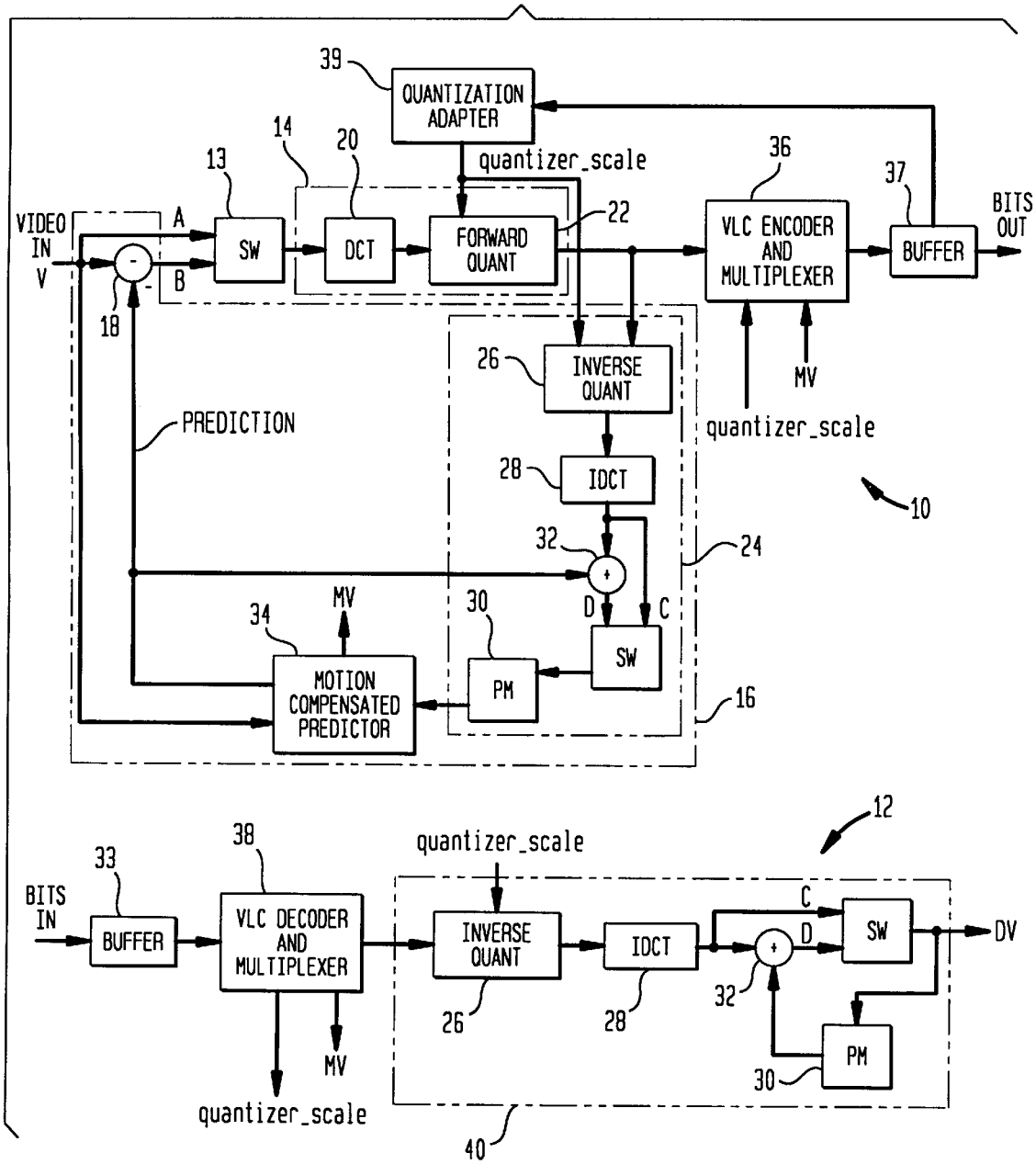
FIG. 1 shows a conventional MPEG-2 compatible encoder and decoder.
Figure 2:
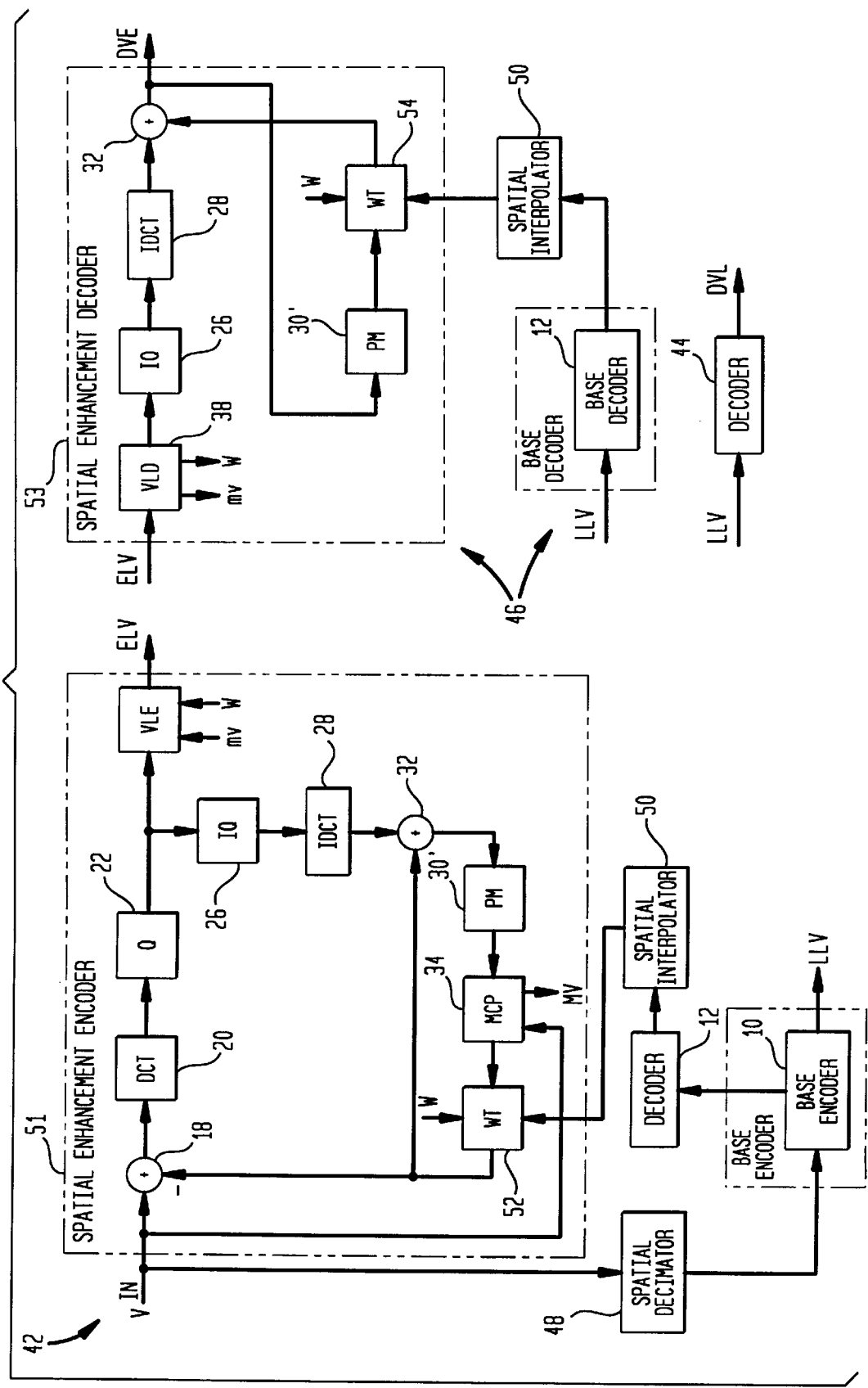
FIG. 2 shows a conventional MPEG-2 spatial scalability encoder and decoder.
Figure 3:
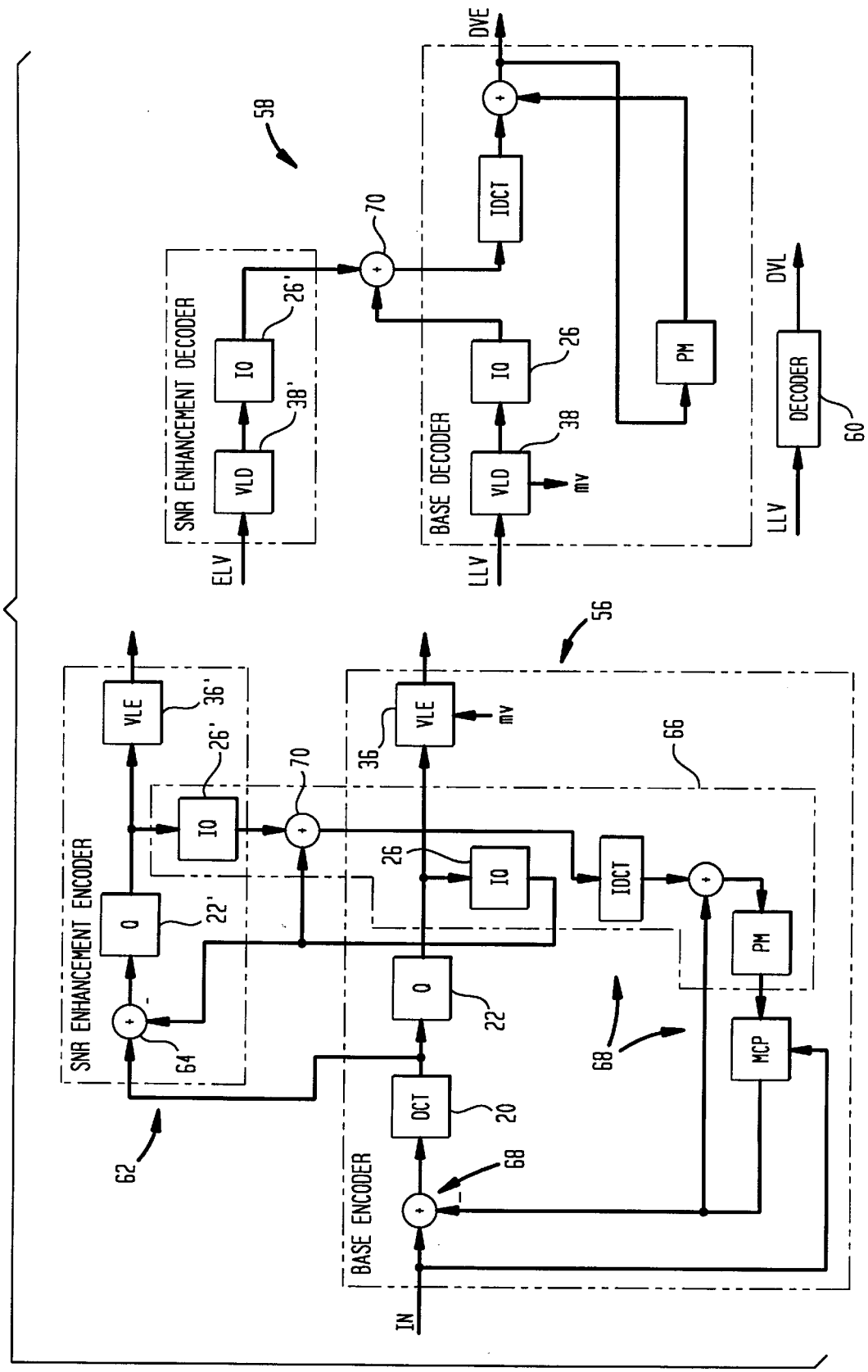
FIG. 3 shows a conventional MPEG-2 SNR scalability encoder and decoder.

Production of the base layer compressed video signal LLV_l occurs similarly as in the encoder 10 of FIG. 1. The signal flow for the base layer compressed video signal is shown by thin lines in FIG. 6. Digital video V is inputted to the block formatter 402 which forms the digital video into blocks and macroblocks. To-be-encoded macroblocks in selected to-be-encoded frames are inputted to the subtractor 404 and motion compensator 416 of the temporal encoder 460. If an adequate prediction macroblock is found for the to-be-encoded macroblock by the motion compensator 416, then the blocks of the prediction macroblock are outputted to subtractor 404. The motion compensator 416 identifies the selected prediction macroblock by a motion vector MV that is provided for output. If the to-be-encoded macroblock for which the prediction is formed is in a reference frame, the motion vector MV is also used by the decoder 440 of the temporal encoder 460 for reconstructing the reference frame. Subtractor 404 subtracts each block of the prediction macroblock from a corresponding block of the to-be-encoded macroblock.

A switch selects the blocks of the prediction error macroblock outputted from the subtractor 404 via output B or the blocks of the to-be-encoded macroblock via output A. The switch always selects the blocks of the to-be-encoded macroblock for I-frames and selects the blocks of the to-be-encoded macroblock in other frames if no adequate matching prediction macroblock can be found therefor or if a decision is made to nevertheless force the macroblock to be only spatially encoded (as in the case of intra-slice refresh).

The selected blocks are discrete cosine transformed in discrete cosine transformer 404. Each coefficient is quantized in quantizer 406 using adjustable quantizing parameters such as a quantizer matrix or, more importantly, a quantizer step size or "quantizer scale factor." The quantizer scale factor is specifically adjusted for the base layer by quantizer adaptor 420 using parameters denoted "q_scale_l". The coefficients thus produced are scanned out into a sequence according to some predetermined (zig-zag or alternate scan) order.

The decoder 440 of the temporal encoder 460 decodes the reference frames of the base layer compressed video signal. The quantized base layer macroblock coefficients of the frames are dequantized in dequantizer 408 (which uses the same quantizer parameters, such as q_scale_l as the quantizer 406). Dequantized coefficients are inverse scanned back into blocks. The blocks of dequantized coefficients are inverse discrete cosine transformed in inverse discrete cosine transformer 410 to produce blocks of (macroblocks of) pixel data. If the macroblock thus produced was previously only spatially encoded, a switch selects the macroblocks outputted via output C. If the macroblock was both motion compensated temporally encoded and spatially encoded (i.e., is a prediction error macroblock), the appropriate prediction macroblock therefor, identified by the motion vector MV associated with the decoded prediction error macroblock, is retrieved from the picture memory 414. The retrieved prediction macroblock is added to the decoded prediction error macroblock in adder 414. The sum thus produced is outputted via output D and selected by the switch. The reconstructed macroblock selected by the switch is stored at the appropriate location of the picture memory 414 corresponding to its relative spatial location (pixel row and column) and temporal location (the frame to which it corresponds).

The sequence of base layer quantized coefficients, denoted Q_l, the quantizer scale parameters q_scale_l and motion vectors MV, as well as other hierarchical flags and identifiers (such as sequence, picture, macroblock, etc. layer headers and flags) are multiplexed into a base layer compressed video signal LLV_l which complies with some standard such as MPEG-1, MPEG-2, H.263, etc.

The generation of the enhancement layer compressed video signal ELV_l using the enhancement encoder 470 is now described. The dequantizer 408 dequantizes the base layer macroblock coefficient data Q_l of both reference frames and non-reference frames. The inverse discrete cosine transformer 410 inversely discrete cosine transforms the dequantized base layer macroblock coefficient data to reconstruct both macroblocks of pixel data and prediction error macroblocks of pixel data. If the macroblock thus produced was only spatially encoded, it is selected by the switch via output C. On the other hand, if the macroblock is a prediction error macroblock that was both motion compensated temporally encoded and spatially encoded, the prediction error macroblock is outputted to the adder 412. The appropriate prediction macroblock therefor is retrieved from the picture memory 414 as identified by a corresponding motion vector(s) MV. The prediction macroblock is added to the prediction error macroblock and is selected by the switch via output D.

It should be noted that the dequantizer 408, inverse discrete cosine transformer 410, adder 412 and picture memory 414 are part of the decoder 440 of the base layer temporal encoder 460. The decoder 440 performs the same functions described above but only on reference frames. The reference frames thus reconstructed are stored in the picture memory 414 for use in forming predictions. It should be noted that decoding for purposes of generating motion compensated temporal predictions in the base layer and for purposes of generating the enhancement layer can be performed simultaneously. That is, all frames of the base layer are reconstructed a single time for use in both the enhancement layer encoder 470 and the base layer temporal encoder 460. However, only reference frames are stored in the picture memory 414 and are actually used for temporal motion compensated prediction formation in the base layer temporal encoder 460.

As each macroblock is selected by the switch (and possibly stored in the picture memory 414), the selected macroblock is outputted to the subtractor 418. The subtractor 418 also receives the temporarily and spatially aligned original version of the same macroblock from the input video signal V and produces a difference macroblock. Stated another way, assume that the input video signal V is formed of original macroblocks MB(x,y,t) where x is a horizontal pixel position of the original macroblock MB(x,y,t), y is a vertical pixel position of the original macroblock MB(x,y,t) and t designates a particular frame (or picture) of the original video signal containing the original macroblock MB(x,y,t). Each original macroblock MB(x,y,t) is encoded into a base layer encoded macroblock $MB_{LLV}(x,y,t)$. This base layer encoded macroblock $MB_{LLV}(x,y,t)$ is decoded to form the reconstructed macroblock $MB_{DVL}(x,y,t)$. The subtractor 418 subtracts this reconstructed macroblock $MB_{DVL}(x,y,t)$ from the original macroblock MB(x,y,t) to form a difference macroblock $MB_d(x,y,t)$, where $MB_d(x,y,t)=MB(x,y,t)-MB_{DVL}(x,y,t)$. This is done for each original macroblock of the original input video signal V, i.e., for each x, y and t. Note that the subtraction performed by the subtractor 418 is performed according to ordinary matrix math on a pixel-by-pixel basis. Thus, the row, column and picture a re identical for each pixel of $MB_{DVL}(X,y,t)$ a nd the corresponding pixel of MB(x,y,t) from which it is subtracted. Stated another way, each pixel of each macroblock of each frame (picture) reconstructed from the base layer compressed video signal LLV_l is spatially and temporally aligned with the pixel of the original video signal V from which it is subtracted.

The difference macroblocks formed in this fashion are then discrete cosine transformed in discrete cosine transformer 404 to produce difference macroblock coefficient data. The difference macroblock coefficients thus formed are quantized using quantizer 406 (and scanned out into a sequence). Quantizer scale parameters "q_scale_e", which generally will be different (in particular, more fine) than q_scale_ are outputted from quantizer adaptor 420 to quantizer 406 for controlling the quantization. The quantized difference macroblock coefficients, denoted Q_e, and the parameters q_scale_e are then formed into an enhancement layer compressed video signal ELV_l. In forming such a stream, the quantized difference macroblock coefficients may be entropy encoded (e.g., run-level and variable length encoded). Additional indicator and flag information (e.g., picture, sequence, macroblock headers and flags) may be inserted into the enhancement layer stream. While no strictly defined syntax and semantics are provided herein for such addition indicator and flag information (and, unlike the base layer compressed video signal, non e are strictly defined according to a well-known prior art standard such as MPEG-1, MPEG-2, H.263, etc.), a similar syntax and semantics as used in the base layer compressed video signal or in some other type of enhancement layer compressed video signal (spatial, SNR, temporal or data partitioning scalability) may be used in the enhancement layer compressed video signal ELV_l. Such syntax and semantics are within the ordinary skill in this art and are therefore not described herein.

Note that no motion compensation and no temporal prediction are used to encode the enhancement layer compressed video signal ELV_l. Rather, motion compensation temporal decoding is used to decode the base layer compressed video signal LLV_l, which decoded video signal is subtracted, in a temporally and spatially aligned fashion, from the original video signal V to form a difference video signal. The difference video signal is then only spatially encoded. As such, the encoder 400 does not need to decode the enhancement layer compressed video signal ELV_l and no memory space in the picture memory 414 need be allocated for frames (pictures) reconstructed from the enhancement layer compressed video signal ELV_l.

After constructing the base layer and enhancement layer compressed video signals, the encoder 400 multiplexes these two signals together in a fashion that enables them to be easily distinguished and demultiplexed.

The decoder 500 can operate according to the well known manner described above for decoding the remotely originating (low fidelity) base layer compressed video signal LLV_r. In addition, the decoder 500 decodes the locally originating base and enhancement layer compressed video signals LLV_l and ELV_l as follows.

Figure 7:
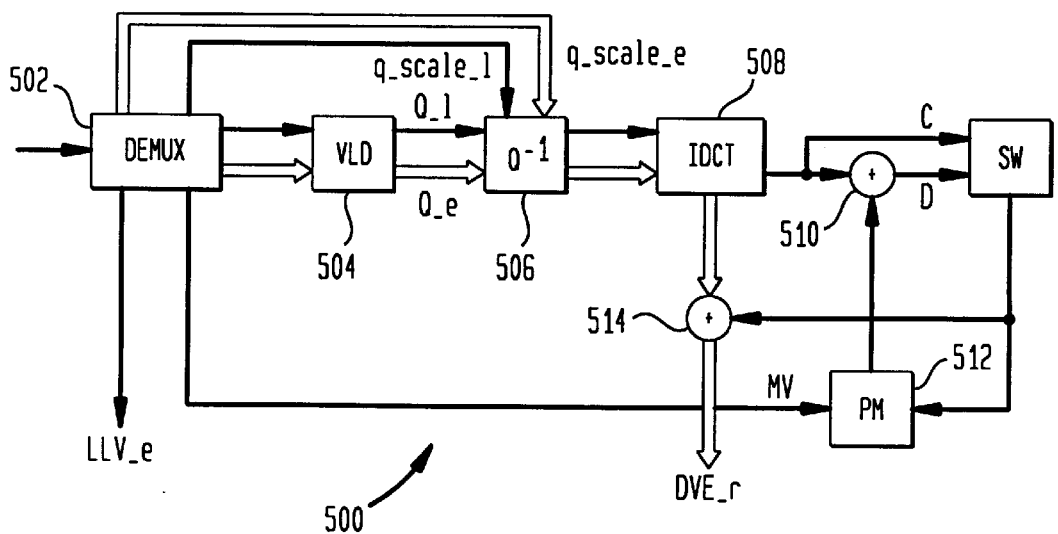
FIG. 7 shows a video decoder according to an embodiment of the invention.

FIG. 7 depicts a decoder 500 according to the present invention in greater detail. A bitstream including the base layer compressed video signal and the enhancement layer compressed video signal is demultiplexed by a demultiplexer 502. The demultiplexer 502 can produce a base layer compressed video signal LLV_l for output to the transceiver 320 (FIG. 5). In addition, the demultiplexer 502 separates out the entropy encoded quantized coefficient signals of the base layer and enhancement layer compressed video signals LLV_l and ELV_l, the motion vectors MV, and the quantizer scale parameters q_scale_l and q_scale_e for the base layer and enhancement layer compressed video signals, respectively.

The entropy encoded quantized coefficients of the base layer and enhancement layer video signals are inputted to an entropy (variable length and run-level) decoder 504. The entropy decoder 504 produces the quantized difference macroblock coefficients Q_e of the enhancement layer compressed video signal and the quantized macroblock and prediction error macroblock coefficients Q_l of the base layer video signal.

The quantized difference macroblock coefficients Q_e and the quantized macroblock and prediction error macroblock coefficients are inputted to a dequantizer 506. The quantizer scale parameters q_scale_l and q_scale_e are also inputted to the dequantizer 506. Using the quantizer scale parameters q_scale_e, the dequantizer 506 dequantizes the quantized difference macroblock coefficients Q_e to produce the dequantized difference macroblock coefficients. Using the quantizer scale parameters q_scale_l, the dequantizer 506 dequantizes the quantized macroblock and prediction error macroblock coefficients Q_l to produce the dequantized macroblock and prediction error macroblock coefficients. The dequantized coefficients of signals Q_e and Q_l are scanned out according to some predetermined order to produce dequantized blocks of difference macroblocks, macroblocks and prediction error macroblocks. The dequantized blocks are then inverse discrete cosine transformed in inverse discrete cosine transformer 508 to produce spatially decoded difference macroblocks, macroblocks and prediction error macroblocks.

The decoded base layer video signal is formed as follows. Each spatially decoded macroblock is outputted via output C through the switch as a reconstructed macroblock. Each spatially decoded prediction error macroblock is outputted to adder 510. One or more motion vectors MV associated with the spatially decoded prediction error macroblock are outputted to a picture memory 512 for purposes of retrieving the prediction macroblock corresponding thereto. The retrieved prediction macroblock is also outputted to adder 510. The adder 510 adds the prediction error macroblock to the retrieved prediction macroblock to form a reconstructed macroblock. The reconstructed macroblock is outputted via output D through the switch. Each reconstructed macroblock of a reference frame is furthermore stored in picture memory 512.

Each spatially decoded difference macroblock is outputted from the inverse discrete cosine transformer 508 to the adder 514. The adder 514 adds each spatially decoded difference macroblock to its corresponding spatially and temporally aligned macroblock reconstructed from the base layer compressed video signal and outputted through the switch. The sum thus produced is the enhanced reconstructed macroblock of the decoded enhancement layer video signal DVE_l. Such enhanced reconstructed macroblocks may be temporarily aggregated in a display buffer (not shown) until a full frame of the decoded enhancement layer video signal DVE_l is decoded. The decoded frame of the signal DVE_l can then be displayed.

Below, Table 1 shows the signal to noise ratio for the chrominance and luminance components of selected frames of a video signal reconstructed from a base layer compressed video signal in a simulation. Table 1 also indicates the bit rate needed to transmit respective frames of such a video signal, frame type, and the number of macroblocks which are spatially only encoded, denoted "Intra MB", or both spatially and temporally encoded, denoted "Inter MB" for each frame. Each frame has 99 macroblocks. Quantized coefficients need not be provided for each macroblock in P (or B) frames. Rather, if the prediction error macroblock contains only zero valued coefficients, no coefficient data is included in the compressed video signal for this macroblock. Instead, the decoded macroblock is reconstructed as the prediction macroblock.

TABLE 1

| Frame # | Type | SNR-Y | SNR-$C_b$ | SNR-$C_r$ | Intra MB | Inter MB | bps |
|---|---|---|---|---|---|---|---|
| 0 | I | 34.52 | 42.33 | 41.39 | 99 | 0 | 13944 |
| 3 | P | 34.18 | 42.67 | 41.62 |  | 62 | 1232 |
| 6 | P | 34.20 | 42.78 | 41.60 |  | 55 | 1224 |
| 12 | P | 33.99 | 43.07 | 41.47 |  | 67 | 2032 |
| 24 | P | 34.10 | 42.83 | 41.54 |  | 63 | 1464 |
| 30 | P | 34.23 | 42.60 | 41.78 |  | 80 | 1920 |
| 33 | P | 34.38 | 42.33 | 41.62 |  | 78 | 1984 |
| 36 | P | 34.34 | 41.98 | 41.61 |  | 75 | 1872 |
| 42 | P | 33.82 | 41.44 | 41.43 | 1 | 81 | 4352 |
| 54 | P | 35.39 | 41.32 | 41.39 | 2 | 70 | 4568 |
| 60 | P | 34.88 | 40.56 | 40.14 | 3 | 62 | 5544 |
| 63 | P | 34.51 | 40.18 | 39.83 | 5 | 63 | 5768 |
| 66 | P | 33.97 | 40.60 | 39.57 |  | 72 | 5464 |
| 72 | P | 34.11 | 40.78 | 39.62 | 1 | 66 | 3784 |
| 84 | P | 33.56 | 40.45 | 39.69 |  | 76 | 4608 |
| 90 | P | 33.51 | 40.13 | 40.07 |  | 72 | 3544 |
| 93 | P | 33.61 | 40.14 | 39.89 |  | 74 | 3528 |
| 96 | P | 33.63 | 40.32 | 39.93 |  | 71 | 2928 |
| 102 | P | 33.82 | 40.34 | 40.20 |  | 54 | 1896 |
| 114 | P | 34.15 | 40.53 | 40.65 |  | 59 | 1344 |
| 120 | P | 34.46 | 40.52 | 40.21 |  | 69 | 1472 |
| 123 | P | 34.30 | 40.58 | 40.21 |  | 67 | 1560 |
| 126 | P | 34.30 | 40.53 | 40.15 |  | 66 | 1648 |
| 132 | P | 34.31 | 40.54 | 39.99 |  | 69 | 1944 |
| 144 | P | 34.37 | 40.55 | 40.21 |  | 64 | 1648 |

Table 2 below shows similar simulation results for a video signal constructed using the enhancement layer compressed video signal according to the present invention.

TABLE 2

| Frame # | Type | SNR-Y | SNR-$C_b$ | SNR-$C_r$ | Intra MB | Inter MB | bps |
|---|---|---|---|---|---|---|---|
| 0 | P | 49.51 | 50.84 | 50.86 | 0 | 99 | 81608 |
| 3 | P | 49.39 | 50.68 | 50.61 | 0 | 99 | 82600 |
| 6 | P | 49.48 | 50.60 | 50.55 | 0 | 99 | 82528 |

TABLE 2-continued

| Frame # | Type | SNR-Y | SNR-$C_b$ | SNR-$C_r$ | Intra MB | Inter MB | bps |
|---|---|---|---|---|---|---|---|
| 12 | P | 49.40 | 50.80 | 50.67 | 0 | 99 | 81640 |
| 24 | P | 49.51 | 50.63 | 50.52 | 0 | 99 | 83328 |
| 30 | P | 49.46 | 50.73 | 50.78 | 0 | 99 | 80416 |
| 33 | P | 49.41 | 50.70 | 50.73 | 0 | 99 | 79200 |
| 36 | P | 49.47 | 50.81 | 50.75 | 0 | 99 | 78784 |
| 42 | P | 49.43 | 50.66 | 50.64 | 0 | 99 | 78952 |
| 54 | P | 49.65 | 51.17 | 51.15 | 0 | 99 | 58928 |
| 60 | P | 49.64 | 51.04 | 51.04 | 0 | 99 | 65824 |
| 63 | P | 49.58 | 51.02 | 50.73 | 0 | 99 | 69912 |
| 66 | P | 49.58 | 50.80 | 50.60 | 0 | 99 | 77160 |
| 72 | P | 49.51 | 50.81 | 50.68 | 0 | 99 | 77944 |
| 84 | P | 49.51 | 50.57 | 50.46 | 0 | 99 | 83024 |
| 90 | P | 49.48 | 50.54 | 50.59 | 0 | 99 | 84368 |
| 93 | P | 49.48 | 50.59 | 50.39 | 0 | 99 | 83984 |
| 96 | P | 49.57 | 50.71 | 50.59 | 0 | 99 | 83728 |
| 102 | P | 49.53 | 50.79 | 50.42 | 0 | 99 | 81744 |
| 114 | P | 49.43 | 50.76 | 50.61 | 0 | 99 | 79136 |
| 120 | P | 49.48 | 50.77 | 50.82 | 0 | 99 | 77960 |
| 123 | P | 49.44 | 50.69 | 50.67 | 0 | 99 | 78016 |
| 126 | P | 49.45 | 50.74 | 50.59 | 0 | 99 | 79832 |
| 132 | P | 49.48 | 50.93 | 50.68 | 0 | 99 | 77744 |
| 144 | P | 49.46 | 50.85 | 50.74 | 0 | 99 | 77960 |

As can be seen, the luminance signal to noise ratio in the decoded enhancement layer video signal DVE is about 15 dB higher than in the decoded base layer video signal DVL. Likewise, the chrominance signal to noise ratio in the decoded enhancement layer video signal DVE is about 8–10 dB higher than in the decoded base layer video signal DVL. The video bandwidth requirement increases from 30.98 kbps, for a the base layer compressed video signal LLV_1 alone, to 798 kbps, for both the enhancement and base layer compressed video signals ELV_1 and LLV_1. The increased bandwidth requirement is greater than the bandwidth of a plain ordinary telephone system dial-up connection under current modem technology. However, the increased bandwidth requirement is well within the 12 Mbps maximum bandwidth of the USB.

The above discussion is intended to be merely illustrative of the invention. Those having ordinary skill in the art may devise numerous alternative embodiments without departing from the spirit and scope of the following claims.

The claimed invention is:

1. A method for presenting video on a local monitor and a remote monitor comprising:
   (a) providing a video signal,
   (b) encoding said video signal to produce a first compressed video signal,
   (c) using said first compressed video signal, encoding said video signal to produce a second compressed video signal,
   (d) transmitting both said first and second compressed video signals to a local terminal,
   (e) at said local terminal, decoding said first and second compressed video signals to produce first and second decoded video signals, recovering a first decoded version of said video signal from a combination of said first and second decoded video signals, and
   (f) transmitting only said first compressed video signal to a remote terminal via a communication channel, whereby said remote terminal can recover a second decoded version of said video signal from only said first compressed video signal.

2. The method of claim 1 wherein said step (c) further comprises the steps of:
   (c1) decoding said first compressed video signal to produce said first decoded video signal,
   (c2) subtracting said first decoded video signal from said video signal to produce a difference video signal,
   (c3) only spatially encoding said difference video signal to produce said second video signal.

3. The method of claim 2 wherein in said step (c2) each pixel of said first decoded video signal is subtracted from a spatially and temporally aligned pixel of said video signal.

4. The method of claim 2 wherein said step (c1) further comprises the steps of:
   (c1a) spatially decoding each macroblock and each prediction error macroblock of said first compressed video signal, and
   (c1b) temporally decoding each spatially decoded prediction error macroblock by identifying a prediction macroblock therefor using at least one motion vector associated with said prediction error macroblock, and adding said identified prediction macroblock to said spatially decoded prediction error macroblock.

5. The method of claim 2 wherein said step (b) comprises quantizing said video signal using first quantizing scale parameters associated with said first compressed video signal and wherein said step (c3) comprises quantizing said difference video signal using second quantizing scale parameters associated with said second compressed video signal.

6. The method of claim 1 further comprising the steps of:
   (c1) prior to step (d), multiplexing said first and second compressed video signals together, and
   (d1) prior to step (e), demultiplexing said first and second video signals at said local terminal.

7. The method of claim 1 further comprising the steps of:
   (f) receiving a third compressed video signal from said remote terminal at said local terminal,
   (g) decoding said third compressed video signal to obtain a decoded third video signal and
   (h) displaying both said decoded third video signal and said first decoded version of said video signal simultaneously on the same display screen.

8. The method of claim 7 wherein said first decoded version of said video signal is displayed on a first part of said display screen and depicts locally originating images and wherein said decoded third video signal is displayed on a second part of said display screen and depicts remotely originating images.

9. The method of claim 7 further comprising the steps of:
   (i) receiving an audio signal from said remote terminal at said local terminal,
   (j) decoding said audio signal to obtain a decoded audio signal and
   (k) presenting said audio signal at said local terminal.

10. An apparatus for presenting video on a local monitor and a remote monitor comprising:
    (a) a video signal source for providing a video signal,
    (b) an encoder connected to said video signal source, said encoder encoding said video signal to produce a first compressed video signal, and using said first compressed video signal to encode said video signal to produce a second compressed video signal,
    (c) a decoder at a local terminal and connected to said encoder, said decoder decoding said first compressed video signal to produce a first decoded video signal, decoding said second compressed video signal to produce a second decoded video signal, and combining said first and second decoded video signals to produce a first decoded version of said video signal, and (d) a transmitter for transmitting only said first compressed video signal to a remote terminal, whereby said remote terminal can recover a second decoded version of said video signal from only said first video signal.

11. The apparatus of claim 10 wherein said encoder further comprises:

a second decoder for decoding said first compressed video signal to produce said first decoded video signal, a subtractor connected to said video signal source and said second decoder for subtracting said first decoded video signal from said video signal to produce an difference video signal, and a spatial encoder connected to said subtractor for only spatially encoding said difference video signal to produce said second video signal.

12. The apparatus of claim 11 wherein said subtractor subtracts each pixel of said first decoded video signal from a spatially and temporally aligned pixel of said video signal.

13. The apparatus of claim 11 wherein said second decoder further comprises:

a spatial decoder for spatially decoding each macroblock and each prediction error macroblock of said first compressed video signal, a picture memory for identifying a prediction macroblock for each spatially decoded prediction error macroblock using at least one motion vector associated with said prediction error macroblock, and an adder for adding said identified prediction macroblock to said spatially decoded prediction error macroblock, wherein said picture memory and said adder temporally decode each prediction error macroblock of said first compressed video signal.

14. The apparatus of claim 11 further comprising:

a quantizer for quantizing said video signal using first quantizing scale parameters associated with said first compressed video signal and for quantizing said difference video signal using second quantizing scale parameters associated with said second compressed video signal.

15. The apparatus of claim 10 wherein said encoder multiplexes said first and second compressed video signals together, and wherein said decoder demultiplexes said first and second video signals at said local terminal.

16. The apparatus of claim 10 further comprising:

a receiver for receiving a third compressed video signal from said remote terminal at said local terminal, and a display screen at said local terminal, wherein said decoder decodes said third video signal to obtain a decoded third video signal, and said display screen displays both said decoded third video signal and said first decoded version of said video signal simultaneously.

17. The apparatus of claim 16 wherein said first decoded version of said video signal is displayed on a first part of said display screen and depicts locally originating images and wherein said decoded third video signal is displayed on a second part of said display screen and depicts remotely originating images.

18. The apparatus of claim 10 further comprising:

a receiver for receiving an audio signal from said remote terminal at said local terminal, an audio decoder for decoding said audio signal to obtain a decoded audio signal, and a loudspeaker for presenting said audio signal at said local terminal.

* * * * *